(No Model.)  2 Sheets—Sheet 1.

W. P. BROWN.
WHEELED CULTIVATOR.

No. 266,086.  Patented Oct. 17, 1882.

WITNESSES:
Thos. Houghton.
Edw. W. Byrn.

INVENTOR:
Wm. P. Brown
BY 
ATTORNEYS.

(No Model.) 2 Sheets—Sheet 2.
W. P. BROWN.
WHEELED CULTIVATOR.
No. 266,086. Patented Oct. 17, 1882.
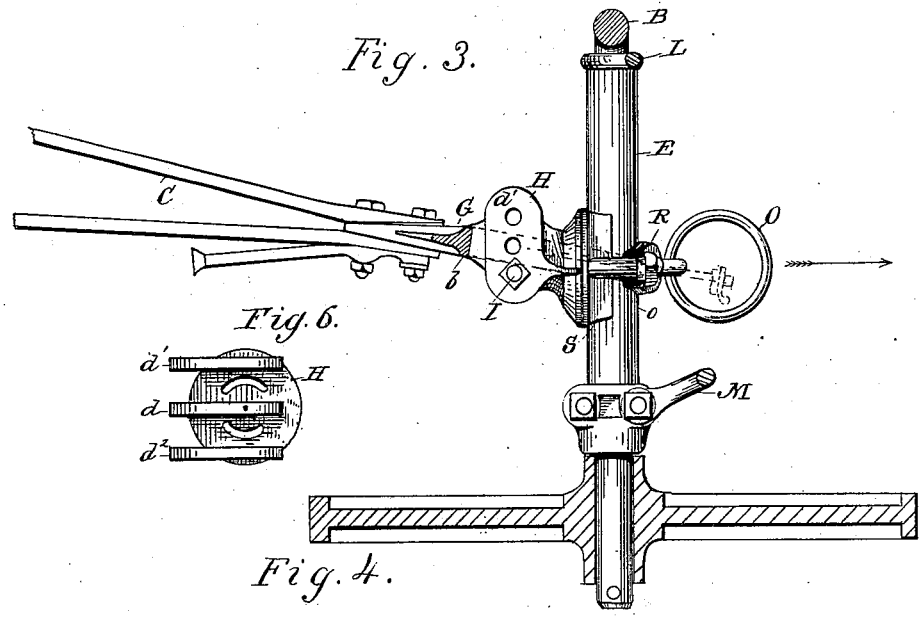
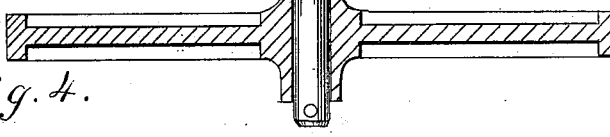
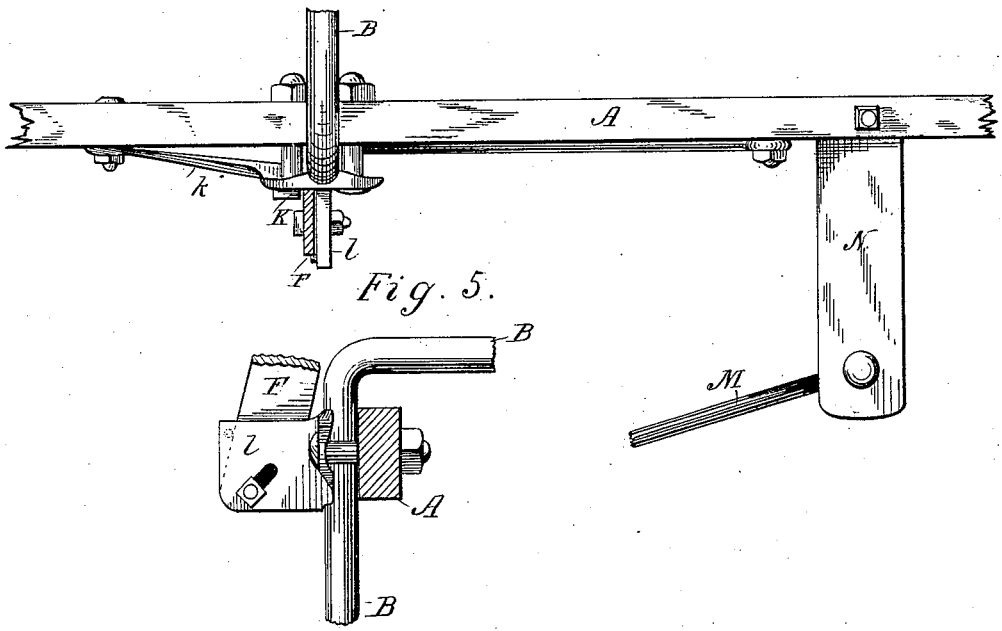
WITNESSES:
Thos. Houghton.
Edw. W. Byrn.
INVENTOR:
Wm. P. Brown
BY
ATTORNEYS.

UNITED STATES PATENT OFFICE.

WILLIAM P. BROWN, OF ZANESVILLE, OHIO.

WHEELED CULTIVATOR.

SPECIFICATION forming part of Letters Patent No. 266,086, dated October 17, 1882.

Application filed May 12, 1882. (No model.)

*To all whom it may concern:*

Be it known that I, WILLIAM P. BROWN, of Zanesville, in the county of Muskingum and State of Ohio, have invented a new and Improved Wheeled Cultivator; and I do hereby declare that the following is a full, clear, and exact description of the same, reference being had to the accompanying drawings, forming part of this specification, in which—

Figure 1:
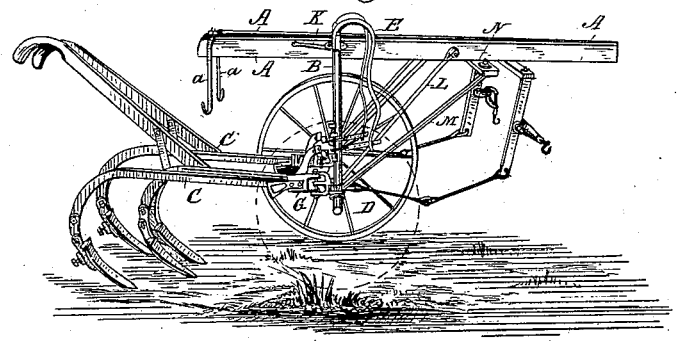
Figure 2:
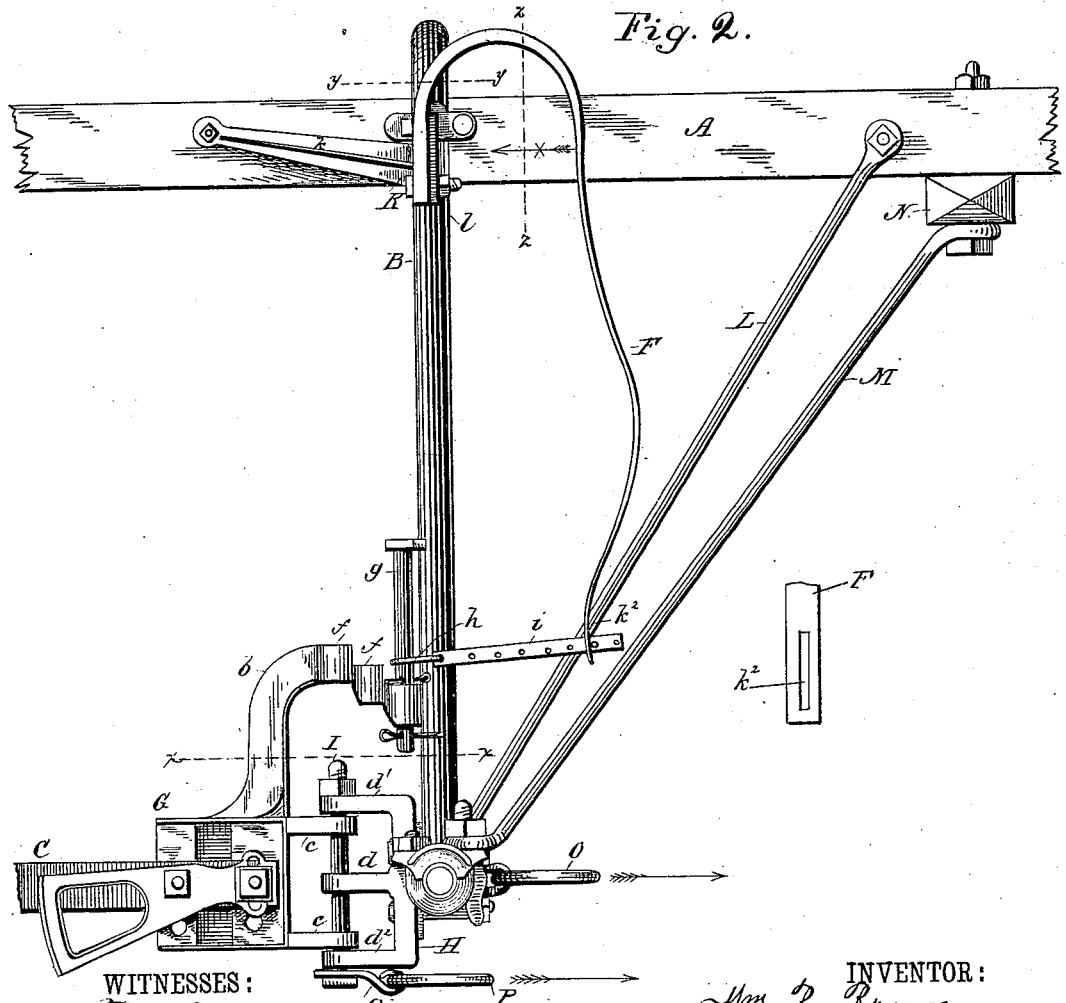
Figure 2:

Figure 1 is a perspective view of a complete cultivator with the rear wheel removed. Fig. 2 is an enlarged side view of the coupling devices for connecting the plows to the wheeled-cultivator frame. Fig. 3 is a view looking down upon the coupling devices, the view being partly in section through the line $x\ x$ of Fig. 2, and showing the position of the pipe-box E between the wheel and the vertical part of the crank-axle. Fig. 4 is a view looking downwardly upon Fig. 2, with the spring in section through line $y\ y$. Fig. 5 is a sectional view through the line $z\ z$, looking in the direction of the crossed arrow; and Fig. 6 is a detail of the bracket H.

My invention relates to certain improvements in wheeled cultivators of that class of which my Patent No. 190,810, granted May 15, 1877, is a type—that is to say, in which an elevated tongue is connected to the upper part of a crank-axle whose lower ends are mounted upon wheels, between which wheels and the vertical section of the crank-axle is located a coupling attachment for the plows or cultivators, which coupling attachment is provided with a spring which co-operates with the lift of the plowman in hanging up the cultivator on the rear hooks of the tongue, while a draft attachment is provided for straining the coupling one way or the other to make the plows run deeper or shallower, as may be desired.

The object of my present invention is principally to so construct the coupling for the cultivator-plows as not only to lift or depress the plows, but also to control the plows against any tendency to sway sidewise, and make them travel more directly in line with the point of attachment with the axle or truck, and also to prevent the springs (when applied to the plow coupling or head) from pulling the plows around to one side whenever they are thrown out of line of draft in the rear, as will be more fully described hereinafter.

In the drawings, A represents the two beams constituting the tongue, which are attached to the upper part of the crank-axle B, and in the rear are provided with hooks $a$, Fig. 1, upon which the cultivator-plows C may be hung up when they are not in use. The crank-axle B is mounted at its lower ends upon wheels D, and between the wheels and the vertical portion of the crank-axle is located a pipe-coupling, E, Fig. 3, being in the nature of a sleeve inclosing the axle, to which the cultivator-plows are attached in the rear, and above which is arranged a co-operating spring, F, whose tension serves to assist the plowman in hanging up his plow-gangs on hooks $a$, and at the same time supplies an elastic pressure for the plows on the ground.

As so far described my invention does not differ materially from my patent already referred to.

I will now proceed to describe my present improvements as a convenient device by which I obtain the results as hereinafter described; but the ordinary mode of coupling the plow-heads to the axle or truck, whereby a vertical and lateral motion is obtained, would afford the same results if a horn or projection were applied to the head of the plow at the same point as mine; but the essence of my invention, as it applies to the spring and its effects or operation on the plows, consists in the application of the plow-head and projection or horn, said horn or projection so arranged as to connect with a spring or weight directly over as well as in front of the pivot-bolt, or pivot-point otherwise constructed than by a bolt, as the means provided for the point for lateral movement is not essential to my invention. So long as the plow has its motion this is all that is necessary. The spring is so located that when attached to the horn or projection it lifts the plows, and assists also to help guide or control them from side sway. The force exerted by the spring on the horn or projection for controlling the plows to run straight is one of the essential features of my invention, as my patent of May 15, 1877, embodies the lifting of the plow by means of a spring, weight, or draft, but does not control the plow to follow the axle straight. I now exert the force of the spring for this further use, and in this provision is made for two or more adjustments to exert more or less side control or guiding force of the spring—first, the location of the pin-bolt I farther forward from the pivot-bolt; second, the hole to the side of the center hole in the head G; third, the shifting of the lower end of the spring out of a direct line in front of the horn on the plow-head. By this it will be seen that the controlling of the plow to follow the axle by a lifting-spring serving this double purpose differs from others in this respect.

G, Figs. 2 and 3, is a head which is rigidly bolted to the beams of the cultivator C by bolts and holes that permit the cultivator-beam to be raised or lowered. This head is loosely connected to a bracket, H, (rigidly fixed to the pipe-coupling,) by means of a vertical pivot-bolt, I, which permits the head G and the cultivator-plows to swing freely from side to side. This head has a horn, neck, or projection, $b$, curving upward and over the pivot-bolt I, Fig. 2, to a point in front of the same, where it connects with the lower end of the spring F, which spring has the function of tending to lift the plows, as in my patent referred to, and has also the additional function of tending to keep the plows C straight in the line of draft, as I will proceed to describe more minutely. It will be perceived that if the connection of the spring were made with the head G on the plow-beams at a point in the rear of the pivot-bolt I any deviation from a straight line in the plows would then permit the springs to pull the plows farther to one side and throw them against the wheel or against the row of plants. By extending the head G up and over the bolt I this tendency is neutralized, while by extending it in front of the bolt I the tension of the spring is utilized for a further novel and useful result, which is the positive tendency of holding the plows always in a straight line, for then any tendency of the plows to vibrate laterally about the pivot-bolt is opposed by the tension of the spring on the other side of said pivot-bolt. This I deem to be an important feature of my improvement, and instead of using a spring to supply the strain or tension said tension may be supplied to the neck or projection $b$ by a weight passing over a pulley in front. I prefer, however, to use the spring, as shown.

For connecting the head G to the bracket H two horizontal flanges, $c\ c$, are formed on the front part of the head, and three flanges, $d\ d'\ d^2$, are formed on the rear part of the bracket, and which flanges are provided with holes through which the vertical pivot-bolt I passes. The head G may be adjusted relatively higher or lower with respect to the bracket H. As shown, it is in middle position with its flanges $c\ c$ between the flanges $d'\ d^2$ of the bracket. To adjust the head higher the flanges $d\ d'$ are placed between $c\ c$. To adjust it lower the flanges $d\ d^2$ are placed between $c\ c$, the distance between said flanges being such as to permit these adjustments. These flanges are also provided with three holes each for the pivot-bolt to pass through. (See Fig. 3.) When the pivot-bolt I is in the middle of these holes the strain of the spring F operates to hold the plows straight. If, however, it is desired to cause the plows to drift sidewise from the center line of draft, so as to approach more closely a row of plants, or resist the tendency of a ridge or row to throw the plows off, then the pivot-bolt is placed in one or the other of the side holes, as in Fig. 3, and the tension of spring F then serves to give the plow a drift or side tendency which opposes the tendency of the ridge to throw the plows away.

For connecting the projection or neck $b$ to the lower part of the spring F vertical holes or sockets $f$, Fig. 2, are formed in the end of the said projection $b$ at different heights, and a headed pin, $g$, is fixed in any one of these holes, according to the leverage required to be exerted by the spring on the plows, and over this pin is loosely placed a loop, $h$, attached to a strap-link, $i$, which latter passes through a slot in the lower end of the spring, and is loosely secured therein by a cross-pin. The object in making the pin $g$ so long is to allow the loop $h$ to slip up to the top of the same as the tension of the spring decreases, and thus increase the effective leverage of said spring on the pipe-coupling, so as to make the lifting effect on the plows more uniform through the entire movement. In connecting the strap-link $i$ to the lower end of the spring F the slot $k^2$ in the latter is made long, which length of the slot allows the strap-link to slip up and down, and enables the springs to lift to a better advantage as the tension decreases.

For holding the crank-axle to the tongue and also sustaining the spring I provide a peculiar form of clamp-brace, K. This clamp-brace is formed with a curved seat to fit the axle, and by means of bolts clamps the axle between it and the tongue. This clamp has a rear extension, $k$, bolted to the tongue to form a brace, and is also formed with a plate, $l$, to which the upper end of the spring F is fastened by a bolt, the bolt-hole being a slotted hole, (see Fig. 5,) to allow the bolt to travel to accommodate the springs.

L and M are brace-rods, attached at their lower ends to the axle, (see Figs. 2 and 3,) on each side of the pipe-box. One of these brace-rods, L, is attached at its upper end to the tongue, and the other is attached to the extended end of a cross-bar, N, which also serves the additional purpose of acting as a stop for the double-tree.

When the draft is to be applied so as to have no effect upon the plows for increasing or diminishing their depth of cultivation, then the draft attachment is connected to the ring O at the front middle portion of the pipe-box clamps. These clamps consist of parts R, S, and H, Fig.

3, connected together by bolts o, of which S and H have clutch-faces and a slotted connection (see Fig. 6) that permit the plows to have a slight axial adjustment about their longitudinal centers. When the draft is to increase the pressure of the plows on the ground the connection is made with the ring P, Fig. 2, which is contained in a perforated loop, Q, that is fastened to the pivot-bolt I by the pipe-bolt nut, which point of connection throws the draft strain below the pipe-box.

Having thus described my invention, what I claim as new is—

1. The plow-head G, having a forward projection, in combination with a spring connected to the said projection of the plow-head at a point over or in front of the vertical pivot-bolt to assist in lifting the plows in the rear and prevent side swing, as described.

2. The combination, with the pipe-box and its bracket H, the pivot-bolt, the plows, and the spring F, of the head G, having a projection extending over and to the front of the pivot-bolt and there connected to the spring, as and for the purpose described.

3. The combination, with the pivot-bolt I, of the bracket H, having flanges with a series of vertical bolt-holes, and the head G, having flanges with a series of vertical bolt-holes, and a neck or arm, b, extending over and to the front of the pivot for connection with the spring, whereby the tension of the latter is made to hold the plows straight or give them a lateral drift, as described.

4. The combination, with the pipe-coupling and the spring F, of the plow-head having projection b, with vertical sockets f at its end, and a pin, g, and a loose sliding connection with the spring, as and for the purpose described.

5. The draft-ring P and perforated loop Q, the latter surrounding the pivot-bolt below the pipe-coupling and combined with the same, the plow-head G and bracket H, as shown and described.

6. The clamp composed of the three parts R S H, fastened together by bolts o, the parts S and H having clutch-faces and a slotted connection that permit of the adjustment of H over S to secure a rotary adjustment of the plows about their longitudinal axis.

WILLIAM PATTERSON BROWN.

Witnesses:
CHARLES E. MUNSON,
W. H. PIERPOINT.